(12) United States Patent
Ninomiya et al.

(10) Patent No.: US 6,184,288 B1
(45) Date of Patent: Feb. 6, 2001

(54) HYDROUS PELLETS OF ETHYLENE-VINYL ACETATE COPOLYMER HYDROLYZATE, PRODUCTION THEREOF AND MOLDINGS FROM SUCH HYDROUS PELLETS

(75) Inventors: Kenji Ninomiya, Ibaraki; Makoto Kunieda, Kurashiki; Koji Izumi; Tomoyuki Yamamoto, both of Ibaraki; Hiroki Goan, Ushiku, all of (JP)

(73) Assignee: Nippon Gohsei Kagaku Kogyo, Osaka (JP)

( * ) Notice: Under 35 U.S.C. 154(b), the term of this patent shall be extended for 0 days.

(21) Appl. No.: 09/118,018

(22) Filed: Jul. 17, 1998

(30) Foreign Application Priority Data

| Jul. 18, 1997 | (JP) | 9-209895 |
| Jul. 23, 1997 | (JP) | 9-213974 |
| Jul. 23, 1997 | (JP) | 9-213975 |
| Aug. 6, 1997 | (JP) | 9-225663 |
| Aug. 6, 1997 | (JP) | 9-225664 |
| Aug. 6, 1997 | (JP) | 9-225665 |
| Sep. 19, 1997 | (JP) | 9-273670 |

(51) Int. Cl.$^7$ .................................................. C08F 8/00
(52) U.S. Cl. ................................................................ 525/61
(58) Field of Search .................................................. 525/61

(56) References Cited

U.S. PATENT DOCUMENTS

| 4,349,644 | * | 9/1982 | Iwanami | 525/57 |
| 4,719,259 | * | 1/1988 | Jenkins | 525/60 |
| 4,753,760 | * | 6/1988 | Kawaguchi | 264/28 |
| 4,847,361 | * | 7/1989 | Asano | 528/494 |
| 4,931,500 | * | 6/1990 | Okamoto | 525/60 |
| 5,089,353 | * | 2/1992 | Negi | 428/518 |
| 5,338,502 | * | 8/1994 | Moriyama | 264/322 |
| 5,492,953 | * | 2/1996 | Itamura | 524/239 |

FOREIGN PATENT DOCUMENTS 47-29578  8/1972  (JP).

* cited by examiner

Primary Examiner—Paul R. Michl
(74) Attorney, Agent, or Firm—Armstrong, Westerman, Hattori, McLeland & Naughton (57) ABSTRACT

The hydrous ethylene-vinyl acetate copolymer hydrolyzate (EVOH) pellets of the present invention are characterized in that they are hydrous pellets of an ethylene-vinyl acetate copolymer hydrolyzate (EVOH) (A) having an ethylene content of 5 to 60 mole percent and a degree of saponification of not less than 90 mole percent and have a water content of 5 to 60% by weight and a storage elastic modulus at 20° C. of $2 \times 10^6$ to $5 \times 10^7$ Pa.

These hydrous pellets preferably contain a small amount of an alcohol (B) containing 1 to 5 carbon atoms and/or a small amount of at least one compound (C) selected from the group consisting of a boron compound (c1), acetic acid (c2), an alkaline metal acetate (c3), an alkaline earth metal acetate (c4) and a phosphoric acid compound (c5).

5 Claims, 2 Drawing Sheets

Fig. 2

HYDROUS PELLETS OF ETHYLENE-VINYL ACETATE COPOLYMER HYDROLYZATE, PRODUCTION THEREOF AND MOLDINGS FROM SUCH HYDROUS PELLETS

TECHNICAL FIELD

The present invention relates to hydrous EVOH pellets derived from an ethylene-vinyl acetate copolymer hydrolyzate (in other words, ethylene-vinyl alcohol copolymer; hereinafter referred to as EVOH for short), a process for the production thereof, and moldings from such EVOH pellets, in particular moldings in the form of films.

PRIOR ART

EVOHs are excellent in such characteristics as gas barrier property, transparency, aroma-retaining property, solvent resistance and oil resistance and, therefore, used in the form of moldings such as films, sheets or bottles or other containers in various packaging applications as food packaging materials, drug packaging materials, industrial chemical packaging materials, agrochemical packaging materials, etc.

A process for producing EVOH films generally comprises molding EVOH pellets into films using a melt extruder or the like, followed, as necessary, by uniaxial or biaxial drawing or stretching. On that occasion of molding, it is a common practice to melt mold an anhydrous or nearly anhydrous EVOH at a temperature of about 200° C. On the occasion of such melt molding, however, gelation and/or eye mucus-like substance formation may occur during melt molding, making long-run molding difficult, or die lines and/or fish eyes may be formed in the product EVOH films, or the EVOH films may be inferior in transparency, in many instances.

In Japanese Patent Publication No. 29578/1972 (the applicant being the same as in the present application), a melt molding process for smoothly carrying out the melt molding of EVOHs is disclosed which comprises allowing an EVOH to uniformly absorb water in an amount of 20 to 60 parts by weight per 100 parts by weight of the EVOH at a temperature of not lower than 40° C. in advance of melt molding of the EVOH and then feeding the EVOH to an extruder for melt molding. As regards the procedure for water absorption, it is stated that the method comprising introducing an EVOH in the form of a powder, granules, pellets or the like into water, followed by stirring, the method comprising adding a predetermined amount of water with stirring or the method comprising contacting an EVOH with steam may be employed. In the examples, an EVOH powder is introduced into water for allowing it to absorb water.

However, the technology of Japanese Patent Publication No. 29578/1972 still has room for improvement with respect to long-period continuous operability and to appearance and stability of quality of product EVOH moldings. In particular, when films are obtained and stretched, there is need for further improving the uniformity in drawing and the appearance and quality of stretched films.

OBJECTS OF THE INVENTION

As a result of their intensive investigations made from the viewpoint of performing melt molding of EVOHs in hydrous state using hydrous EVOH pellets, the present inventors found that hydrous pellets having a specific water content and a specific elastic modulus and preferably having a specific alcohol or a specific compound are suited for use from the viewpoint of continuous moldability, quality of moldings and stretchability of moldings.

Accordingly, it is a primary object of the present invention to provide hydrous EVOH pellets improved in moldability and capable of providing moldings with good appearance and quality and good stretchability, to provide a process for producing such hydrous pellets and to provide moldings molded using such hydrous pellets.

SUMMARY OF THE INVENTION

The hydrous ethylene-vinyl acetate copolymer hydrolyzate (EVOH) pellets of the present invention are characterized in that they are hydrous pellets of an ethylene-vinyl acetate copolymer hydrolyzate (EVOH) (A) having an ethylene content of 5 to 60 mole percent and a degree of saponification of not less than 90 mole percent and have a water content of 5 to 60% by weight and a storage elastic modulus at 20° C. of $2 \times 10^6$ to $5 \times 10^7$ Pa.

These hydrous pellets preferably contain a small amount of an alcohol (B) containing 1 to 5 carbon atoms and/or a small amount of at least one compound (C) selected from the group consisting of a boron compound (c1), acetic acid (c2), an alkaline metal acetate (c3), an alkaline earth metal acetate (c4) and a phosphoric acid compound (c5).

The process for producing hydrous ethylene-vinyl acetate copolymer hydrolyzate (EVOH) pellets according to the present invention is characterized in that a solution of an ethylene-vinyl acetate copolymer hydrolyzate (EVOH) (A) with an ethylene content of 5 to 60 mole percent and a degree of saponification of not less than 90 mole percent in a mixed solvent composed of water and an alcohol is extruded in the form of a strand through a nozzle into a coagulating bath comprising water or a mixed solvent composed of water and an alcohol, the strand after coagulation is cut to porous pellets containing water and the alcohol in large amounts, and that the porous pellets are washed by contacting with water, and dried to give hydrous pellets, whereby hydrous pellets which have a water content of 5 to 60% by weight and a storage elastic modulus at 20° C. of $2 \times 10^6$ to $5 \times 10^7$ Pa are obtained.

The molded product of the present invention is a product obtained by melt molding the above-mentioned hydrous ethylene-vinyl acetate hydrolyzate (EVOH) pellets.

DETAILED DESCRIPTION OF THE INVENTION

<EVOH (A)>

The EVOH (A) to be suitably used in producing hydrous EVOH pellets according to the present invention has an ethylene content of 5 to 60 mole percent, preferably 10 to 60 mole percent, more preferably 20 to 55 mole percent, and a degree of saponification of the vinyl acetate component of not less than 90 mole percent, preferably not less than 95 mole percent, most preferably not less than 98 mole percent. If the ethylene content is less than 5 mole percent, the water resistance will be insufficient. At an ethylene content exceeding 60 mole percent, poor gas barrier property will result. When the degree of saponification is lower than 90 mole percent, the water resistance and gas barrier property will be unsatisfactory. EVOH species having such an ethylene content and such a degree of saponification may be used either singly or two or more of them may be used in combination.

The EVOH (A) may further contain a minor amount of a comonomer or comonomers selected from among α-olefins, such as propylene, isobutene, α-octene, α-dodecene and α-octadecene, unsaturated carboxylic acids or salts, partial alkyl esters, complete alkyl esters, nitrites, amides or anhydrides thereof, unsaturated sulfonic acids or salts thereof, vinylsilane compounds, vinyl chloride, styrene and vinyl ethers, for instance. It may be "postmodified", for example by derivatization into a urethane, acetalization or cyanoethylation.

<Water content of the hydrous EVOH pellets>

The water content of the hydrous EVOH pellets according to the present invention is set at 5 to 60% by weight, preferably 10 to 50% by weight, more preferably 20 to 40% by weight. When the water content is too low, the melting point becomes high, making low-temperature melt extrusion difficult to perform. When the water content is excessively high, water back-flow may occur during extrusion molding, making smooth molding difficult to realize.

<Storage elastic modulus of the hydrous EVOH pellets>

It is necessary for the hydrous EVOH pellets of the present invention to have a storage elastic modulus at 20° C. of $2 \times 10^6$ to $5 \times 10^7$ Pa, preferably $3 \times 10^6$ to $2 \times 10^7$ Pa. A storage elastic modulus below $2 \times 10^6$ Pa leads to lack of molding stability whereas when it exceeds $5 \times 10^7$ Pa, a high torque will result in the step of extrusion processing, making it impossible to achieve the objects of the present invention.

The "storage elastic modulus" is a value measured upon transmission of vibrations of 10 Hz to the pellets and can be measured using a DMA (dynamic mechanical analyzer). In the present specification, the storage elastic modulus is expressed in terms of a measured value at 20° C. as obtained during continuous storage elastic modulus measurement with a DMA while raising the temperature of the hydrous EVOH pellets from 10 to 50° C. at a rate of 3° C./min.

<Hardness of the hydrous EVOH pellets>

While they have the above-mentioned storage elastic modulus, the hydrous EVOH pellets of the present invention preferably have a hardness (measured according to JIS A K 6301, type A spring type hardness testing) at 20° C. of 50 to 90, preferably 55 to 85, more preferably 60 to 80. This hardness is a characteristic value similar in nature to the above-mentioned storage elastic modulus and, when the hardness is too low, the pellet form tends to become unfavorable. When, conversely, the hardness is too high, the extrusion molding at low temperatures tend to become difficult. The hardness of the pellets is measured for the cut surface of the pellets as obtained upon cutting the strand-form EVOH to pellets.

<Alcohol (B) containing 1 to 5 carbon atoms>

The hydrous EVOH pellets of the present invention preferably contains a small proportion of an alcohol (B) containing 1 to 5 carbon atoms. The alcohol (B) containing 1 to 5 carbon atoms includes methanol, ethanol, propanol, butanol, pentanol, etc. Among these, methanol is most preferred from the industrial viewpoint.

The content of said alcohol (B) is desirably 0.00001 to 0.1% by weight, preferably 0.0001 to 0.05% by weight, in particular 0.001 to 0.05% by weight, relative to the hydrous EVOH pellets. The presence of alcohol (B) in such small proportion has a storage elastic modulus-controlling effect on the hydrous pellets and, when the content of alcohol (B) is within the above range, it is easy to obtain the hydrous pellets having a storage elastic modulus within the above range. The presence of a small proportion of alcohol (B) is also favorable from the moldability viewpoint, contributing to prevent the molded films from losing their surface smoothness due to formation of streaks on their surface or their surface becoming uneven. An excessive content of alcohol (B) should be avoided, however, since it may lead to bubble formation in the molded films.

<Compound (C)>

It is preferred that the above-mentioned hydrous EVOH pellets contain a small proportion of at least one compound (C) selected from the group consisting of a boron compound (c1), acetic acid (c2), an alkali metal acetate (c3), an alkaline earth metal acetate (c4) and a phosphoric acid compound (c5). The content of compound (C) is not more than 1 part by weight per 100 parts by weight of EVOH (A) but should correspond to an effective amount.

More particularly, since said effective amount varies according to the species of compound (C) employed, the content of compound (C) is preferably within the following range. Thus, the content of compound (C) per 100 parts by weight of EVOH (A) is preferably:

0.001 to 1 part by weight on the boron basis when said compound (C) is a boron compound (c1), 0.001 to 1 part by weight when said compound (C) is acetic acid (c2), 0.0001 to 0.1 part by weight when said compound (C) is an alkali metal acetate (c3), 0.0001 to 0.1 part by weight when said compound (C) is an alkaline earth metal acetate (c4), or 0.0005 to 0.1 part by weight on the phosphate group basis when said compound (C) is a phosphoric acid compound (c5). When two or more compounds (C) belonging to different categories are used, the compound (C) of one category meets the above quantity requirement for said category and the amounts of the other compounds (C) do not exceed the upper limits imposed above on the respective categories.

The respective categories of compound (C) and the contents thereof are further described in the following.

Boron compound (c1)

The boron compound (c1) includes boric acid, borax, and derivatives of these; halogenated boron compounds such as trichloroborane, and coordination compounds thereof with ethers or amines; trialkylborons or triarylborons, such as trimethylboron and triphenylboron, and coordination compounds thereof; boric acid salts such as sodium tetraborate; and the like. Among these, boric acid and borax are preferred.

The content of boron compound (c1) on the boron basis is 0.001 to 1 part by weight, preferably 0.001 to 0.8 part by weight, more preferably 0.001 to 0.5 part by weight, per 100 parts by weight of the above-mentioned EVOH (A). When its content is too small, the addition of the boron compound may fail to produce the intended effects from the mechanical property or heat stability viewpoint. When its content is excessive, the problems of surface roughening and ununiform section of moldings tend to occur, leading to poor moldability.

Acetic acid (c2)

The content of acetic acid (c2) is 0.001 to 1 part by weight, preferably 0.003 to 0.5 part by weight, more preferably 0.005 to 0.2 part by weight, per 100 parts of the above-mentioned EVOH (A). When the content of acetic acid is too low, the effects of the present invention cannot be fully obtained in some instances. When said content is excessive, a large number of streaks may be formed on the surface of moldings and there is an increasing tendency toward discoloration.

Alkali metal acetate (c3)

The alkali metal acetate (c3) includes lithium acetate, sodium acetate, potassium acetate, cesium acetate, etc. Among these, sodium acetate and potassium acetate are preferred.

The content of alkali metal acetate (c3) on the alkali metal basis is 0.0001 to 0.1 part by weight, preferably 0.0002 to 0.05 part by weight, more preferably 0.0003 to 0.04 part by weight, most preferably 0.0004 to 0.03 part by weight, per 100 parts by weight of the above-mentioned EVOH (A). When the content of alkali metal acetate (c3) is too low, the effects of the invention may not be obtained in certain instances. If said content is excessive, a large number of streaks may be formed on the surface of moldings and there is an increasing tendency toward discoloration.

Alkaline earth metal acetate (c4)

The alkaline earth metal acetate (c4) includes calcium acetate, magnesium acetate, barium acetate, beryllium acetate, etc. Among these, calcium acetate and magnesium acetate are preferred.

The content of alkaline earth metal acetate (c4) on the alkaline earth metal basis is 0.0001 to 0.1 part by weight, preferably 0.0005 to 0.03, more preferably 0.0010 to 0.03 part by weight, most preferably 0.0015 to 0.015 part by weight, per 100 parts by weight of the above-mentioned EVOH (A). When the content of alkaline earth metal acetate (c4) is too low, the effects of the invention may not be obtained in some instances. When said content is excessive, there is an increasing tendency toward thermal decomposition and toward odor emanation.

Phosphoric acid compound (c5)

The phosphoric acid compound (c5) includes not only phosphoric acid but also potassium dihydrogen phosphate, dipotassium hydrogen phosphate, sodium dihydrogen phosphate, disodium hydrogen phosphate, tripotassium phosphate, trisodium phosphate, calcium dihydrogen phosphate, magnesium dihydrogen phosphate and the like. Among these, phosphoric acid, potassium dihydrogen phosphate, sodium dihydrogen phosphate, calcium dihydrogen phosphate and magnesium dihydrogen phosphate are preferred.

The content of phosphoric acid compound (c5) on the phosphate radical basis is 0.0005 to 0.1 part by weight, preferably 0.001 to 0.05 part by weight, per 100 parts by weight of the above-mentioned EVOH (A). When the content of phosphoric acid compound (c5) is too low, the effects of the invention may not be obtained in certain instances. When said content is excessive, there is an increasing tendency toward fish eye formation on films.

<Process for producing the hydrous EVOH pellets>

The hydrous EVOH pellets can be produced typically in the following manner.

First, a solution of the EVOH (A) in a mixed solvent composed of water and an alcohol is extruded in the form of a strand through a nozzle into a coagulating bath comprising water or a mixed solvent composed of water and an alcohol, and the strand after coagulation is cut to porous pellets containing water and the alcohol in large amounts. The hydrous porous pellets are then washed by contacting them with water, and dried to give hydrous pellets. In this way, hydrous pellets which have a water content of 5 to 60% by weight and a storage elastic modulus at 20° C. of $2 \times 10^6$ to $5 \times 10^7$ Pa can be obtained.

It is important that the hydrous EVOH pellets of the present invention be produced in the wet throughout the production process, namely by coagulating the solution of EVOH (A), contacting the coagulate with water and reducing and adjusting the water content to a specified level by drying, as mentioned above. Any process comprising allowing almost water-free EVOH pellets once obtained to contain water, even when the water content is eventually adjusted to 5 to 60% by weight, can hardly give a storage elastic modulus within the range mentioned above and, when the hydrous pellets obtained are subjected to melt molding, the moldability will be insufficient and it is difficult to obtain such high-quality moldings as obtainable according to the present invention.

<Method of adjusting the water content and method of incorporation of alcohol (B)>

As the method of adjusting the water content, the method may preferably be employed which comprises mixing EVOH pellets (containing water and methanol) in the production process with water, stirring the resulting mixture and then adjusting the water content by drying. When this method is employed, the alcohol (methanol) content can be adjusted simultaneously by utilizing the methanol used in the production of EVOH (A).

Thus, in the process for producing EVOH (A), there are opportunities for contacting with methanol, for example the methanol solvent used in the step of copolymerization of ethylene and vinyl acetate, the methanol vapor used in the subsequent step of residual monomer elimination, the methanol vapor used in the further subsequent step of saponification and the solvent (methanol or a water-methanol mixture) for the saponification catalyst, among others, and, as a result, the EVOH (A) produced contains a large amount of methanol.

Since the thus-obtained EVOH (A) generally contains about 10 to 70% by weight of water and about 70 to 10% by weight of methanol, this solution of EVOH (A) in the water-alcohol mixed solvent is extruded in the form of a strand through a nozzle into a coagulating bath comprising water or a water-alcohol mixed solvent and, after coagulation, the strand is cut to give porous pellets (in the case of cylindrical pellets, about 2 to 5 mm in length and about 2 to 5 mm in diameter) containing water and alcohol in large amounts.

Then, the hydrous, porous pellets are contacted with water. This contacting procedure is performed once or repeated several times, whereby impurity elimination and methanol removal are realized and the water content is adjusted. On that occasion, the mixing ratio between the hydrous, porous pellets and water (when the contacting is repeated twice or more, sum total thereof) is preferably about ⅕ to ⅟₁₅ by weight, for instance, and the water preferably has a temperature of 20 to 40° C. The processing time preferably amounts to about 120 to 240 minutes.

Such procedure for contacting with water gives hydrous pellets containing a large amount of water with a reduced methanol content. The pellets are then contacted with air or an inert gas (e.g. nitrogen gas) or a water-alcohol mixed vapor at a temperature of not higher than 90° C. (preferably 90 to 70° C.) to thereby adjust the methanol content in the hydrous pellets to 0.00001 to 0.1% by weight and at the same time adjust the water content to 5 to 60% by weight. The contacting of the hydrous pellets with air or an inert gas can be effected by using a box drier, band drier, rotary drier, flash drier or fluidized bed drier, for instance.

<Method of incorporating compound (C)>

The method of incorporating compound (C) is not limited to any particular one provided that a specified amount of compound (C) is eventually contained in the hydrous EVOH pellets. The most suited method comprises adding compound (C) to the water to be used in contacting porous pellets with water, or adjusting the amount of compound (C) already present in the system in the step of contacting with water to a specified level.

<Melt molding>

The hydrous EVOH pellets of the present invention are fed to an extruder and melt-molded into moldings. The conditions in the molding step are not particularly limited. For film production, a nonvent screw-type extruder is generally used and films are produced by extruding at a melt temperature of 40 to 150° C., preferably 60 to 140° C. For the films produced to retain water with a uniform distribution, it is desirable to use screws affording a compression ratio of 2.0 to 4.0.

The hydrous EVOH pellets to be subjected to melt molding may be supplemented with a small amount of a plasticizer, such as ethylene glycol, propylene glycol or glycerol, in an appropriate step during the production of said hydrous pellets or prior to subjecting said hydrous pellets to melt molding. A suitable content of such a plasticizer is 0.2 to 10% by weight, for instance. An additive or additives selected from among antioxidants, lubricants, hydrotalcites, anti-static agents, colorants, ultraviolet absorbers, inorganic or organic fillers, biocides and the like may be added in amounts which will not be harmful to the effects of the present invention.

<Drawing>

The moldings in the form of films as obtained in the above manner are subjected to drawing or stretching, as necessary. The water content of the moldings in the step of drawing (just prior to drawing) is desirably adjusted to 5 to 50% by weight, preferably 7 to 45% by weight, more preferably 10 to 40% by weight. At a water content lower than 5% by weight, there is a tendency toward drawing speck formation, which may cause breakage. At a higher water content than 50% by weight, it is difficult to produce the improving effects on the gas barrier property and strength as resulting from sufficient orientation by drawing.

The method of adjusting the water content of the moldings to be subjected to drawing is not limited to any particular one. A moisture conditioning procedure may be added immediately following the film production.

The drawing may be uniaxial or biaxial (simultaneous or sequential). Since, however, the present invention is particularly effective in the first drawing (in the machine direction (MD)) in sequential biaxial drawing, such drawing is described below in further detail.

The above-mentioned EVOH films with an adjusted water content are first submitted to the step of first drawing (in the direction of MD). The first (MD) drawing can be carried out by a conventional method and said films are stretched at a stretching ratio of 1.5 to 8 in the longitudinal direction at a temperature of 30 to 110° C., preferably 40 to 100° C. It is desirable that the water content after first (MD) drawing be 0.5 to 45% by weight, preferably 1 to 40% by weight. When said water content is below 0.5% by weight, there is a tendency toward drawing speck formation in the step of second drawing (in the transverse direction (TD)). When said water content exceeds 45% by weight, the effect of orientation in the first drawing cannot be expected and the improving effects on gas barrier property and strength will diminish. Adjustment to such water content can be made by adjusting the pre-heating roll temperature and the time of preheating, the temperature and rate of drawing in the first (MD) drawing, for instance.

The EVOH films stretched in the above-mentioned first (MD) drawing are then submitted to the second (TD) drawing for stretching in the transverse direction. In such step, any conventional method can be utilized, and the above-mentioned EVOH films are drawn in the transverse direction at a stretching ratio of 1.5 to 8 at a temperature of 60 to 140° C.

This second (TD) drawing is generally carried out by the tenter technique with both film edges held with clips. Under other conditions than those mentioned above, breakage tends to occur at clipped sites, between clips and/or in the middle of the film transverse direction, making it difficult to obtain the desired oriented films.

<Thermal fixation>

Generally, thermal fixation is further performed following drawing. The thermal fixation comprises heating the films in taut condition at a temperature of 120 to 200° C. for several seconds to several minutes. For providing the films after thermal fixation with flexibility and dimensional stability, the films may be moisture-conditioned to a water content of about 0.3 to 4% by weight, preferably about 0.5 to 3% by weight.

<Laminates>

The EVOH moldings (films) obtained in accordance with the present invention or the stretched products derived therefrom are put to practical use not only as single-layer products but also as laminates at least one layer of which is such EVOH film.

In producing said laminates, the films, sheets or like resin moldings obtained in the above manner are overlaid, on one side or both sides, with another or other substrates. The method of lamination comprises, for example, laminating said resin moldings with another or other substrate films or sheets using a known adhesive such as an organotitanium compound, isocyanate compound, polyethyleneimine compound, polyester compound or polyurethane compound.

Said other substrate films are films of an olefin homopolymer or copolymer such as linear low-density polyethylene, low-density polyethylene, medium-density polyethylene, high-density polyethylene, an ethylenevinyl acetate copolymer, an ionomer, ethylene-propylene copolymer, an ethylene-acrylic ester copolymer, polypropylene, a propylene-α-olefin (α-olefin containing 4 to 20 carbon atoms) copolymer, polybutene or polypentene, or a polyolefin resin in a broader sense as derived from such olefin homopolymer or copolymer by modification by grafting of an unsaturated carboxylic acid or an ester thereof, a polystyrene resin, a polyester, a polyamide, a copolyamide, polyvinyl chloride, polyvinylidene chloride, an acrylic resin, a vinyl ester resin, a polyester elastomer, a polyurethane elastomer, chlorinated polyethylene, chlorinated polypropylene, EVOH or the like. Furthermore, paper, metal foils, uniaxially or biaxially oriented plastic films or sheets, woven fabrics, nonwoven fabrics, wooden surfaces and the like may also be used.

When they are film- or sheet-like, the laminates may have not only the bilayer structure X/Y but also arbitrary combinations such as Y/X/Y, X/Y/X, $X_1/X_2/Y$, $X/Y_1/Y_2$, $Y_2/Y_1/X/Y_1/Y_2$ and so forth, where X ($X_1$, $X_2$, . . . ) stands for an EVOH composition film layer and Y ($Y_1$, $Y_2$, . . . ) for another substrate layer, for example a thermoplastic resin layer.

<Caldera-like elliptically raised portions>

It is preferred that the above-mentioned stretched moldings have, on their surface, caldera-like elliptically raised portions with a major axis of 10 to 150 μm and a circumferential height of 0.1 to 3 μm at a frequence of occurrence of not less than one (preferably 5 to 20) per square millimeter. This is because the presence of caldera-like elliptically raised portions having such specific shape and size contributes to preventing the transparency from decreasing on one hand and, on the other, improving the interlaminar adhesion in the production of laminates.

The caldera-like elliptically raised portions refer to elliptical shapes scattered on the stretched film surface and having a convex rim and a concave inside. The number and major axis can be determined using a differential interference microscope (e.g. OPTIPHOT-2 produced by Kabushiki Kaisha Nikon), and the shape can be confirmed using a universal surface shape measuring instrument (e.g. MODEL SE-30K produced by Kabushiki Kaisha Kosaka Kenkyusho).

<Applications>

The thus-obtained EVOH moldings as well as stretched products and laminates derived therefrom are excellent in characteristic features, namely in appearance and gas barrier property, among others, and therefore are very useful in application thereof as films, sheets, tubes, bags, containers and the like for packaging foods, drugs, agrochemical compositions, industrial chemicals and the like.

EXAMPLES

The following examples and comparative examples illustrate the present invention in further detail. In the examples and comparative examples, "part(s)" and "%" are on the weight basis except for the expression "mole %" and for "%" relative to the evaluation items "change in torque, change in output and change in film thickness".

[Assay methods, molding conditions, stretching conditions, and evaluation methods]

In the following examples and comparative examples, the methods for assaying alkali metals, alkaline earth metals, phosphate radical, and boron were respectively as mentioned below.

Film molding by extrusion of hydrous pellets and film stretching were carried out under the conditions mentioned below.

Evaluation with respect to various items was made also as mentioned below.

<Assaying of alkali metals and alkaline earth metals>

About 80 g of a dried sample was accurately weighed, about 10 g thereof was placed in a tared platinum evaporating dish and carbonized on an electric heater. The dish was then heated with a gas burner and burned until no smoke was emitted any longer. The platinum evaporating dish was then placed in an electric oven maintained at about 400° C. and mostly covered with a porcelain lid, and the temperature was raised gradually to 700° C. and then maintained at 700° C. for 3 hours for complete reduction to ashes. To the platinum crucible was added 2 ml of hydrochloric acid (special reagent grade) and 3 ml of pure water, and the residue was dissolved by heating on an electric heater. The solution was flushed into a 50-ml volumetric flask with pure water, and pure water was added up to the marked line. This solution was used as a sample for atomic absorption spectrometry.

Separately, a standard solution (1 ppm of an alkali or alkaline earth metal, in about 0.5 N hydrochloric acid) was prepared. Using this as a control solution, atomic absorption spectrometry was performed and the alkali metal was quantitated based on the absorption ratio. The measurement conditions were as follows:

Apparatus: Hitachi model 180-30 atomic absorption/flame spectrophotometer;

Flame: Acetylene-air.

<Phosphate radical assay>

The phosphate radical assay was performed by the molybdenum blue (ascorbic acid) technique of spectrophotometry according to JIS K 0120. For sample preparation, however, the following procedure was followed:

1. One gram of the sample weighed exactly is placed in a 300-ml Kjeldahl flask.
2. About 5 ml of pure water is added, and about 15 ml of concentrated sulfuric acid is added dropwise gradually.
3. The Kjeldahl flask is heated on a heater, and the water and sulfuric acid are removed just prior to dryness.
4. After cooling, about 5 ml of concentrated sulfuric acid is added, and the mouth of the Kjeldahl flask is covered with a funnel, followed by heating again.
5. After commencement of white smoke filling the flask, several drops of concentrated nitric acid is gradually added and, once the Kjeldahl flask inside has assumed a brown color due to NOx gas, the dropping of nitric acid is discontinued and heating is continued until substitution with white smoke. This dropping of nitric acid under heating is repeated several times.
6. When the solution in the Kjeldahl flask has become colorless or assumed a transparent yellowish green color, the dropping of nitric acid is discontinued, and the residual nitric acid and water are purged from the solution.
7. The funnel covering the mouth of the Kjeldahl flask is removed, and the sulfuric acid is purged by igniting until the residue amounts to 2 to 3 ml. Note: A separate blank test is performed simultaneously without adding the sample.

<Boron assay>

The resin composition was subjected to alkali fusion, followed by assaying by ICP (inductively coupled plasma) emission spectrometry (apparatus: Seiko SPS 4000).

<Film molding by extrusion of hydrous pellets>

Hydrous pellets are fed to a single-screw extruder fitted with a T die and extrusion-molded under the conditions specified below to give a film having a thickness of 120 $\mu$m (in Examples 1 to 3, 40 $\mu$m).

| | |
|---|---|
| Screw inside diameter: | 40 mm |
| L/D: | 28 |
| Screw compression ratio: | 3.2 |
| T die: | Coat hanger type |
| Die width: | 450 mm |
| Extrusion conditions (conditions 1): | |
| | $C_1$: 70° C., H: 100° C. |
| | $C_2$: 80° C., D: 100° C. |
| | $C_3$: 100° C. |
| | $C_4$: 100° C. |
| Extrusion conditions (conditions 2): | |
| | $C_1$: 110° C., H: 110° C. |
| | $C_2$: 120° C., D: 110° C. |
| | $C_3$: 100° C. |
| | $C_4$: 100° C. |

<Film stretching>

Using each film obtained in the above manner as the raw film, sequential biaxial stretching, thermal fixation and moisture conditioning are carried out continuously under the conditions shown below to give a stretched film.

| First stretching (MD stretching) conditions | |
| --- | --- |
| Stretching machine | Roll type primary stretcher |
| Stretching roll temperature | 70° C. |
| MD stretching ratio | 2.0 times |
| Post-stretching film thickness | 60 μm |
| Post-stretching water content | about 25 to 30% |
| Second stretching (TD stretching) conditions | |
| Stretching machine | Tenter type biaxial stretcher |
| Stretching roll temperature | 110° C. |
| TD stretching ratio | 3.0 times |
| Post-stretching film thickness | 20 μm |
| Post-stretching water content | about 0.5 to 2% |
| Thermal fixation conditions | |
| Temperature | 160° C. |
| Time | 3 seconds |

Moisture conditioning conditions

Allowing to stand under conditions of 20° C. and 65% RH for 7 days.

Water content after moisture conditioning about 2 to 3%

<Evaluation methods>

Moldability evaluation

Change in torque in the step of molding

The change in extruder motor load (screw torque amperes at a screw speed of 40 rpm) during 96-hour continuous film production was determined and evaluated as follows:

o . . . change less than 5%

Δ . . . change from 5% to less than 10% x . . . change not less than 10%

Change in output in the step of molding

The change in extruder output (screw speed: 40 rpm) during 96-hour continuous film production was determined and evaluated as follows:

o . . . change less than 5%

Δ . . . change from 5% to less than 10% x . . . change not less than 10%

Change in film thickness in the step of molding

The film thickness in the MD direction was measured at 1-hour intervals and the percent change was determined and evaluated as follows:

o . . . change less than 5%

Δ . . . change from 5% to less than 10% x . . . change not less than 10%

Evaluation of biaxially stretched films

Transparency

The haze value was measured.

Gas barrier property

The oxygen permeability (cc.20 μm/m²·day·atm) was determined under conditions of 20° C. and 65% RH.

Film appearance

Streaks o . . . No streak was observed.

Δ . . . slight number of streaks were observed, without producing any problem from the practical viewpoint.

x . . . A large number of streaks were observed, making practical use difficult.

Fish eyes (evaluation 1)

o . . . 0 to 3 fish eyes per 100 cm² (film size: 10 cm×10 cm)

Δ . . . 4 to 20 fish eyes per 100 cm² x . . . 21 or more fish eyes per 100 cm²

Fish eyes (evaluation 2)

o . . . 0 to 3 fish eyes per 100 cm² (film size: 10 cm×10 cm)

Δ . . . 4 to 50 fish eyes per 100 cm² x . . . 51 or more fish eyes per 100 cm²

Discoloration o . . . No discoloration was observed.

Δ . . . Slight yellowing was observed.

x . . . Yellowing was significant, making practical use difficult.

Examples 1 to 3 and Comparative Examples 1 and 2

Example 1

A pressure reactor was charged with 1,000 parts of a 40% methanol solution of an ethylene-vinyl acetate copolymer with an ethylene content of 40% and the contents were heated at 110° C. with stirring. Then, saponification was carried out for 2.5 hours while continuously feeding 40 parts of a 6% methanol solution of sodium hydroxide and 2,500 parts of methanol and distilling off the byproduct methyl acetate and the excess methanol from the system, to give an EVOH (A) with a degree of saponification of the vinyl acetate component of 99.0 mole percent.

After completion of the saponification, the excess methanol was distilled off while feeding 450 parts of 30% aqueous methanol, whereby a solution of the EVOH (A) in water-methanol (mixing ratio: 3/7) with a resin concentration of 39% was obtained.

This EVOH (A) solution in water-methanol (with a liquid temperature adjusted to 50° C.) was extruded in the form of a strand through a nozzle with a bore diameter of 4 mm into water at 5° C. in a coagulation vessel (100 mm in width, 4,000 mm in length and 100 mm in depth) at a rate of 1.5 kg/hr. After completion of the coagulation, the strand was taken out via a draw-off roll (linear velocity 2 m/min) disposed at the end of the coagulation vessel and cut with a cutter to give white porous pellets having a diameter of 4 mm and a length of 4 mm. These pellets had a methanol content of 38%, a water content of 22% and a sodium acetate content of 1.5 parts (per 100 parts of EVOH).

Then, 100 parts of the pellets were introduced into 400 parts of warm water at 30° C. and the mixture was stirred for about 60 minutes. After three repetitions of this procedure, 0.6 part of acetic acid was added and the mixture was contacted with a nitrogen atmosphere at 80° C. for 30 minutes in an oven to give hydrous EVOH pellets with a methanol content of 0.01%, a water content of 30%, a sodium acetate content of 0.05 part (or sodium content of 0.014 part) (per 100 parts of EVOH) and an acetic acid content of 0.2 part (per 100 parts of EVOH).

The thus-obtained hydrous EVOH pellets had a storage elastic modulus at 20° C. of 5×10⁶ Pa and a hardness at 20° C. of 70.

Example 2

Porous pellets were produced in the same manner as in Example 1, with an ethylene content of 40 mole percent, a degree of saponification of 99.0 mole percent, a methanol content of 38%, a water content of 22% and a sodium acetate content of 1.5% (per 100 parts of EVOH).

Then, 100 parts of the pellets were introduced into 300 parts of a 0.5% aqueous acetic acid solution at 30° C. and the mixture was stirred for about 30 minutes. After two repetitions of that procedure, 100 parts of the pellets were introduced into 400 parts of warm water at 30° C. and the mixture was stirred for about 60 minutes. After three repetitions of this procedure, 0.15 part of sodium acetate and 0.3 part of acetic acid were added, and the mixture was then contacted with a nitrogen atmosphere at 80° C. in an oven for 30 minutes, to give hydrous EVOH pellets with a methanol content of 0.008%, a water content of 35%, a sodium acetate content of 0.03 part (or sodium content of 0.008 part) (per 100 parts of EVOH) and an acetic acid content of 0.13 part (per 100 parts of EVOH).

The thus-obtained hydrous EVOH pellets had a storage elastic modulus at 20° C. of $4 \times 10^6$ Pa and a hardness at 20° C. of 65.

Example 3

An EVOH (A) with a degree of saponification of 99.2 mole percent was obtained in the same manner as in Example 1 except that an ethylene-vinyl acetate copolymer with an ethylene content of 29.5 mole percent was used. The EVOH was processed in the same manner as in Example 1 to give hydrous EVOH pellets with a methanol content of 0.008%, a water content of 30%, a sodium acetate content of 0.04 part (or sodium content of 0.011 part) (per 100 parts of EVOH) and an acetic acid content of 0.2 part (per 100 parts of EVOH).

The thus-obtained hydrous EVOH pellets had a storage elastic modulus at 20° C. of $5.5 \times 10^6$ Pa and a hardness at 20° C. of 75.

Figure 1:
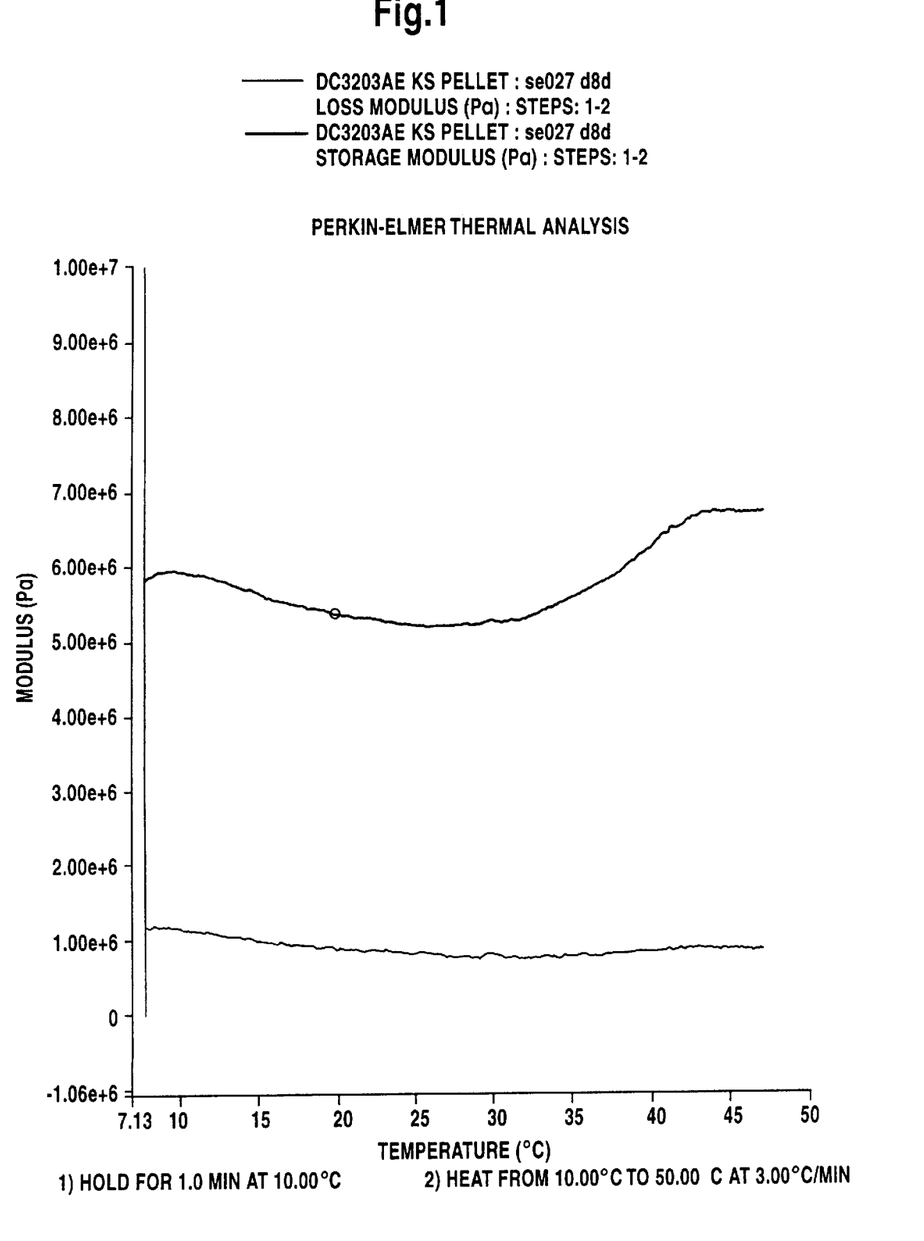
FIG. 1 is a storage elastic modulus measurement chart for the hydrous EVOH pellets produced in Example 3 as obtained by means of a DMA (dynamic mechanical analyzer).

FIG. 1 is a DMA measurement chart for the hydrous EVOH pellets of Example 3.

Comparative Example 1

The procedure of Example 1 was followed without pellet washing and drying, to give hydrous EVOH pellets having a storage elastic modulus at 20° C. of $1 \times 10^6$ Pa and a hardness at 20° C. of 30. These hydrous pellets had a methanol content of 38%, a water content of 22% and a sodium acetate content of 1.5 parts (or sodium content of 0.42 part) (per 100 parts of EVOH).

Comparative Example 2

The procedure of Example 1 was followed but the drying was performed at a temperature of about 100° C. (by contacting with a nitrogen atmosphere at 100° C. for 20 hours), to give hydrous EVOH pellets having a storage elastic modulus at 20° C. of $6 \times 10^7$ Pa and a hardness at 20° C. of 100. These hydrous pellets had a methanol content of 0.015%, a water content of 1.2% and a sodium acetate content of 0.05 part (or sodium content of 0.014 part) (per 100 parts of EVOH).

Results

The hydrous EVOH pellets of Examples 1 to 3 and Comparative Examples 1 and 2 were respectively fed to a singly-screw extruder equipped with a T die and extrusion-molded under the above-mentioned film-forming conditions (with extrusion temperature conditions 1) to give 40-μm-thick films. The results of evaluation in terms of change in torque, change in output, change in film thickness, and film appearance (fish eye evaluation 1) as obtained by 96-hour continuous film production are shown in Table 1.

TABLE 1

| | Storage elastic modulus (Pa) | Hardness | Change in torque | Change in output | Change in film thickness | Fish eyes |
|---|---|---|---|---|---|---|
| Example 1 | $5 \times 10^6$ | 70 | ○ | ○ | ○ | ○ |
| Example 2 | $4 \times 10^6$ | 65 | ○ | ○ | ○ | ○ |
| Example 3 | $5.5 \times 10^6$ | 75 | ○ | ○ | ○ | ○ |
| Compar. Ex. 1 | $1 \times 10^6$ | 30 | x | x | x | x |
| Compar. Ex. 2 | $6 \times 10^7$ | 100 | x | x | x | ○ |

As the data shown in Table 1 indicate, the procedures of the Examples can give films and other moldings excellent in uniformity of thickness, with good low-temperature melt-moldability and slight changes in torque and output in the step of melt molding. The moldings obtained are useful as films, sheets, tubes or containers for packaging foodstuffs, drugs, agro-chemical compositions and industrial chemicals.

Examples 4 to 6 and Comparative Examples 3 to 6

Example 4

An EVOH (A) with an ethylene content of 35 mole percent and a degree of saponification of 99.8 mole percent was obtained by carrying out saponification in the same manner as in Example 1 except that an ethylene-vinyl acetate copolymer with an ethylene content of 35 mole percent was used.

Further, hydrous porous EVOH pellets were produced in the same manner as in Example 1. The pellets were treated with an aqueous solution of acetic acid with stirring and further with an aqueous solution of boric acid with stirring, followed by drying to give hydrous EVOH pellets with a methanol content of 0.01%, a water content of 37.5% and a boric acid content of 0.3 part (or boron content of 0.05 part) (per 100 parts of EVOH). These hydrous EVOH pellets had a storage elastic modulus at 20° C. of $4 \times 10^6$ Pa.

Using these hydrous EVOH pellets, molding was carried out under the film production conditions mentioned above (with extrusion temperature conditions 2) for 96 hours. A fish eye-free good film with a thickness of 120 μm could be obtained without gelation or eye mucus-like matter formation.

Then, using this film as a raw film, sequential biaxial stretching, thermal fixation and moisture conditioning were continuously carried out under the conditions mentioned above, to give an oriented film. The water content at the raw film stage was 35%, the water content of the film after first stretching was 30%, the water content of the film after second stretching was 2%, and the water content of the stretched film after moisture conditioning was 2.7%.

The biaxially oriented film obtained was evaluated for transparency, oxygen permeability, film appearance and fish eyes (evaluation 2).

Example 5

Hydrous EVOH pellets, a film and an oriented film were obtained in the same manner as in Example 4 except that the hydrous EVOH pellets had a methanol content of 0.01%, a water content of 25% and a boric acid content of 1.2 parts (or boron content of 0.2 part) (per 100 parts of EVOH).

These hydrous EVOH pellets had a storage elastic modulus at 20° C. of $4 \times 10^6$ Pa.

The water content at the raw film stage was 22%, the water content of the film after first stretching was 20%, the water content of the film after second stretching was 0.6%, and the water content of the stretched film after moisture conditioning was 2.5%. The moldability of the film (raw film) was as good as in Example 4 and the biaxially oriented film obtained was free of fish eyes.

Example 6

Hydrous EVOH pellets, a film and an oriented film were obtained in the same manner as in Example 4 except that the hydrous EVOH pellets had an ethylene content of 28 mole percent, a degree of saponification of 98.6 mole percent, a methanol content of 0.01%, a water content of 35% and a boric acid content of 0.06 part (or boron content of 0.01 part) (per 100 parts of EVOH).

These hydrous EVOH pellets had a storage elastic modulus at 20° C. of $4.5 \times 10^6$ Pa.

The water content at the raw film stage was 33%, the water content of the film after first stretching was 28%, the water content of the film after second stretching was 1.5%, and the water content of the stretched film after moisture conditioning was 2.8%. The moldability of the film (raw film) was as good as in Example 4 and the biaxially oriented film obtained was free of fish eyes.

Comparative Example 3

The procedure of Example 4 was followed using hydrous EVOH pellets with a methanol content of 0.0001% and a water content of 0.5% (since, however, the resin did not melt at 120° C., hence could not be extruded, the film extrusion molding was performed at 210° C.). The film (raw film) obtained had a large number of fish eyes about 0.1 mm in size. In the stretching treatment, film breakage occurred in the process of second stretching, hence stable drawing was impossible and any satisfactory stretched film could not be obtained.

The hydrous EVOH pellets had a storage elastic modulus at 20° C. of $1.5 \times 10^8$ Pa.

Comparative Example 4

The procedure of Example 4 was followed using hydrous EVOH pellets with a methanol content of 0.0005% and a water content of 4.8% (since, however, the resin did not melt at 120° C., hence could not be extruded, the film extrusion molding was performed at 190° C.). The film (raw film) obtained had a large number of fish eyes about 0.1 mm in size. In the stretching treatment, film breakage occurred in the process of second stretching, hence stable drawing was impossible and any satisfactory stretched film could not be obtained.

The hydrous EVOH pellets had a storage elastic modulus at 20° C. of $4 \times 10^7$ Pa.

Comparative Example 5

The procedure of Example 4 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 4.

The hydrous EVOH pellets had a storage elastic modulus at 20° C. of $1 \times 10^6$ Pa.

Results

The results of evaluation as obtained in Examples 4 to 6 and Comparative Examples 3 to 6 are shown in Table 2. In Table 2, the oxygen permeability data are given in cc•20 µm/m²•day•atm. In evaluating for fish eyes, the evaluation criteria 2 were employed.

TABLE 2

| | Transparency (haze value) | Oxygen permeability | Film appearance | Fish eyes |
|---|---|---|---|---|
| Example 4 | 0.3 | 0.5 | Good | ○ |
| Example 5 | 0.3 | 0.5 | Good | ○ |
| Example 6 | 0.4 | 0.7 | Good | ○ |
| Compar. Ex. 3 | (No stretched film was obtained.) | | | |
| Compar. Ex. 4 | (No stretched film was obtained.) | | | |
| Compar. Ex. 5 | 0.8 | 0.7 | Poor | Δ |

Examples 7 to 10 and Comparative Examples 6 to 8

Example 7

Saponification was carried out in the same manner as in Example 1 to give an EVOH (A) with an ethylene content of 40 mole percent and a degree of saponification of 99.0 mole percent.

Further, following the procedure of Example 1, hydrous, porous EVOH pellets were produced and treated in acetic acid-water with stirring and further treated with acetic acid plus sodium acetate in water with stirring, followed by drying to give hydrous EVOH pellets with a methanol content of 0.01%, a water content of 37.5%, a sodium acetate content of 0.1 part (or sodium content of 0.028 part) (per 100 parts of EVOH). These hydrous EVOH pellets had a storage elastic modulus at 20° C. of $4 \times 10^6$ Pa.

These hydrous EVOH pellets were molded under the above-mentioned film forming conditions (with extrusion temperature conditions 2) to give a film having a thickness of 120 µm. Long-run operations (4 days and 10 days) were carried out and film appearance evaluation was made in the above-mentioned manner.

Then, using this film as the raw film, sequential biaxial stretching, thermal fixation and moisture conditioning were carried out continuously under the conditions mentioned above to give an oriented film. The water content at the raw film stage was 35%, the water content of the film after first stretching was 30%, the water content of the film after second stretching was 2%, and the water content of the stretched film after moisture conditioning was 2.5%.

Long-run operations (4 days and 10 days) were carried out and the biaxially stretched films obtained were evaluated for appearance as mentioned above.

Example 8

Hydrous EVOH pellets with a methanol content of 0.01%, a water content of 25% and a sodium acetate content of 0.05 part (or sodium content of 0.014 part) (per 100 parts of EVOH) were obtained in the same manner as in Example 7 except that pellets of an EVOH (A) with an ethylene content of 35 mole percent and a degree of saponification of 99.8 mole percent were used. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner. The water content at the raw film stage was 22%, the water content of the film after first stretching was 20%, the water content of the film after second stretching was 0.6%, and the water content of the stretched film after moisture conditioning was 2.5%.

Example 9

Hydrous EVOH pellets with a methanol content of 0.01%, a water content of 35% and a sodium acetate content of 0.03 part (or sodium content of 0.0084 part) (per 100 parts of EVOH) were obtained in the same manner as in Example 7 except that pellets of an EVOH (A) with an ethylene content of 28 mole percent and a degree of saponification of 98.6 mole percent were used. The hydrous EVOH pellets had a storage elastic modulus at 20° C. of $4.5 \times 10^6$ Pa.

Using these hydrous EVOH pellets, film production, stretching, thermal fixation and moisture conditioning were carried out and the films obtained were evaluated in the same manner. The water content at the raw film stage was 33%, the water content of the film after first stretching was 28%, the water content of the film after second stretching was 1.5%, and the water content of the stretched film after moisture conditioning was 2.8%.

Example 10

Hydrous EVOH pellets with a methanol content of 0.01%, a water content of 25% and a potassium acetate content of 0.013 part (or potassium content of 0.0052 part) (per 100 parts of EVOH) were obtained in the same manner as in Example 7 except that pellets of an EVOH (A) with an ethylene content of 35 mole percent and a degree of saponification of 99.8 mole percent were used. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner. The water content at the raw film stage was 22%, the water content of the film after first stretching was 20%, the water content of the film after second stretching was 0.6%, and the water content of the stretched film after moisture conditioning was 2.5%.

Comparative Example 6

The procedure of Example 7 was followed using hydrous EVOH pellets with a methanol content of 0.0005% and a water content of 4.8%. (Since, however, the resin did not melt at 120° C., hence could not be extruded, the film extrusion molding was performed at 190° C.). The film (raw film) obtained had streaks and fish eyes. Discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $3.5 \times 10^7$ Pa.

Comparative Example 7

The procedure of Example 7 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 7.

The hydrous EVOH pellets had a storage elastic modulus at 20° C. of $1 \times 10^6$ Pa.

Comparative Example 8

The procedure of Example 7 was followed using hydrous EVOH pellets with a methanol content of 0.0001% and a water content of 0.5%. (Since, however, the resin did not melt at 120° C., hence could not be extruded, the film extrusion molding was performed at 210° C.). The film (raw film) obtained had streaks and fish eyes about 0.1 mm in size. Discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $1 \times 10^8$ Pa.

Results

The results of evaluation as obtained in Examples 7 to 10 and Comparative Examples 6 to 8 are shown in Table 3 (for the raw films) and Table 4 (for the stretched films). In Tables 3 and 4, "FE" stands for fish eyes (evaluation 1) and "DC" for discoloration.

TABLE 3

(Raw films)

| | 4-Day continuous operation Film appearance | | | 10-Day continuous operation Film appearance | | |
|---|---|---|---|---|---|---|
| | Streaks | FE | DC | Streaks | FE | DC |
| Example 7 | ○ | ○ | ○ | ○ | ○ | ○ |
| Example 8 | ○ | ○ | ○ | ○ | ○ | ○ |
| Example 9 | ○ | ○ | ○ | ○ | ○ | ○ |
| Example 10 | ○ | ○ | ○ | ○ | ○ | ○ |
| Compar. Ex. 6 | x | ○ | ○ | x | x | Δ |
| Compar. Ex. 7 | x | ○ | ○ | x | ○ | ○ |
| Compar. Ex. 8 | x | x | ○ | x | x | Δ |

TABLE 4

(Stretched films)

| | 4-Day continuous operation Film appearance | | | 10-Day continuous operation Film appearance | | |
|---|---|---|---|---|---|---|
| | Streaks | FE | DC | Streaks | FE | DC |
| Example 7 | ○ | ○ | ○ | ○ | ○ | ○ |
| Example 8 | ○ | ○ | ○ | ○ | ○ | ○ |
| Example 9 | ○ | ○ | ○ | ○ | ○ | ○ |
| Example 10 | ○ | ○ | ○ | ○ | ○ | ○ |
| Compar. Ex. 6 | (No stretched film was obtained.) | | | | | |
| Compar. Ex. 7 | x | ○ | ○ | x | ○ | ○ |
| Compar. Ex. 8 | (No stretched film was obtained.) | | | | | |

Examples 11 to 14 and Comparative Examples 9 to 11

Example 11

Saponification was carried out in the same manner as in Example 1 to give an EVOH (A) with an ethylene content of 40 mole percent and a degree of saponification of 99.0 mole percent.

Further, following the procedure of Example 1, hydrous, porous EVOH pellets were produced and treated in acetic acid-water with stirring and further treated in a mixed aqueous solution containing acetic acid, calcium acetate and magnesium acetate with stirring, followed by drying to give hydrous EVOH pellets with a methanol content of 0.01%, a water content of 37.5%, a calcium acetate content of 0.025 part (or calcium content of 0.0063 part) (per 100 parts of EVOH) and a magnesium acetate content of 0.012 part (or magnesium content of 0.0020 part) (per 100 parts of EVOH). These hydrous EVOH pellets had a storage elastic modulus at 20° C. of $4 \times 10^6$ Pa.

These hydrous EVOH pellets were molded under the above-mentioned film forming conditions (with extrusion temperature conditions 2) to give a film having a thickness of 120 μm. Long-run operations (4 days and 10 days) were carried out and film appearance evaluation was made in the above-mentioned manner.

Then, using this film as the raw film, sequential biaxial stretching, thermal fixation and moisture conditioning were carried out continuously under the conditions mentioned above to give an oriented film. The water content at the raw film stage was 35%, the water content of the film after first stretching was 30%, the water content of the film after second stretching was 2%, and the water content of the stretched film after moisture conditioning was 2.5%.

Example 12

Hydrous EVOH pellets with a methanol content of 0.01%, a water content of 25% and a calcium acetate content of 0.047 part (or calcium content of 0.012 part) (per 100 parts of EVOH) were obtained in the same manner as in Example 11 except that pellets of an EVOH (A) with an ethylene content of 35 mole percent and a degree of saponification of 99.8 mole percent were used and treated with an aqueous solution containing acetic acid and calcium acetate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Example 13

Hydrous EVOH pellets with a methanol content of 0.01%, a water content of 35% and a magnesium acetate content of 0.024 part (or magnesium content of 0.004 part) (per 100 parts of EVOH) were obtained in the same manner as in Example 11 except that pellets of an EVOH (A) with an ethylene content of 28 mole percent and a degree of saponification of 98.6 mole percent were used and treated with an aqueous solution containing acetic acid and magnesium acetate. The hydrous EVOH pellets had a storage elastic modulus at 20° C. of $4.5 \times 10^6$ Pa.

Using these hydrous EVOH pellets, film production, stretching, thermal fixation and moisture conditioning were carried out and the films obtained were evaluated in the same manner as mentioned above. The water content at the raw film stage was 33%, the water content of the film after first stretching was 28%, the water content of the film after second stretching was 1.5%, and the water content of the stretched film after moisture conditioning was 2.8%.

Example 14

Hydrous EVOH pellets with a methanol content of 0.01%, a water content of 25%, a calcium acetate content of 0.016 part (or calcium content of 0.004 part) (per 100 parts of EVOH), a magnesium acetate content of 0.006 part (or magnesium content of 0.001 part) (per 100 parts of EVOH) and a sodium acetate content of 0.018 part (or sodium content of 0.005 part) (per 100 parts of EVOH) were obtained in the same manner as in Example 11 except that pellets of an EVOH (A) with an ethylene content of 35 mole percent and a degree of saponification of 99.8 mole percent were used and treated with an aqueous solution containing acetic acid, calcium acetate, magnesium acetate and sodium acetate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Comparative Example 9

The procedure of Example 11 was followed using hydrous EVOH pellets with a methanol content of 0.0005% and a water content of 4.8%. (Since, however, the resin did not melt at 120° C., hence could not be extruded, the film extrusion molding was performed at 190° C.). The film (raw film) obtained had streaks and fish eyes and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $3.5 \times 10^7$ Pa.

Comparative Example 10

The procedure of Example 11 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 11.

The hydrous EVOH pellets had a storage elastic modulus at 20° C. of $1 \times 10^6$ Pa.

Comparative Example 11

The procedure of Example 11 was followed using hydrous EVOH pellets with a methanol content of 0.0001% and a water content of 0.5%. (Since, however, the resin did not melt at 120° C., hence could not be extruded, the film extrusion molding was performed at 210° C.). The film (raw film) obtained had streaks and fish eyes about 0.1 mm in size and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $1 \times 10^8$ Pa.

Results

The results of evaluation as obtained in Examples 11 to 14 and Comparative Examples 9 to 11 are shown in Table 5 (for the raw films) and Table 6 (for the stretched films). In Tables 5 and 6, "FE" stands for fish eyes (evaluation 1) and "DC" for discoloration.

TABLE 5

(Raw films)

| | 4-Day continuous operation Film appearance | | | 10-Day continuous operation Film appearance | | |
|---|---|---|---|---|---|---|
| | Streaks | FE | DC | Streaks | FE | DC |
| Example 11 | ○ | ○ | ○ | ○ | ○ | ○ |
| Example 12 | ○ | ○ | ○ | ○ | ○ | ○ |
| Example 13 | ○ | ○ | ○ | ○ | ○ | ○ |
| Example 14 | ○ | ○ | ○ | ○ | ○ | ○ |
| Compar. Ex. 9 | x | ○ | ○ | x | x | Δ |
| Compar. Ex. 10 | x | ○ | ○ | x | ○ | ○ |
| Compar. Ex. 11 | x | x | ○ | x | x | Δ |

TABLE 6

(Stretched films)

| | 4-Day continuous operation Film appearance | | | 10-Day continuous operation Film appearance | | |
|---|---|---|---|---|---|---|
| | Streaks | FE | DC | Streaks | FE | DC |
| Example 11 | ○ | ○ | ○ | ○ | ○ | ○ |
| Example 12 | ○ | ○ | ○ | ○ | ○ | ○ |
| Example 13 | ○ | ○ | ○ | ○ | ○ | ○ |
| Example 14 | ○ | ○ | ○ | ○ | ○ | ○ |
| Compar. Ex. 9 | (No stretched film was obtained.) | | | | | |
| Compar. Ex. 10 | x | ○ | ○ | x | ○ | ○ |
| Compar. Ex. 11 | (No stretched film was obtained.) | | | | | |

Examples 15 to 18 and Comparative Examples 12 to 14

Example 15

Saponification was carried out in the same manner as in Example 1 except that an ethylene-vinyl acetate copolymer with an ethylene content of 30 mole percent was used, to give an EVOH (A) with an ethylene content of 30 mole percent and a degree of saponification of 99.0 mole percent.

Further, following the procedure of Example 1, hydrous, porous EVOH pellets were produced and treated in water with stirring and further treated in a mixed aqueous solution containing acetic acid and calcium dihydrogen phosphate with stirring, followed by drying to give hydrous EVOH pellets with a methanol content of 0.01%, a water content of 37.5%, a sodium content of 0.011 part (per 100 parts of EVOH), a calcium content of 0.004 part (per 100 parts of EVOH) and a phosphate radical content of 0.018 part (per 100 parts of EVOH). These hydrous EVOH pellets had a storage elastic modulus at 20° C. of $4 \times 10^6$ Pa.

These hydrous EVOH pellets were molded under the above-mentioned film forming conditions (with extrusion temperature conditions 2) to give a film having a thickness of 120 μm. Long-run operations (4 days and 10 days) were carried out and film appearance evaluation was made in the above-mentioned manner.

Then, using this film as the raw film, sequential biaxial stretching, thermal fixation and moisture conditioning were carried out continuously under the conditions mentioned above to give an oriented film. The water content at the raw film stage was 35%, the water content of the film after first stretching was 30%, the water content of the film after second stretching was 2%, and the water content of the stretched film after moisture conditioning was 2.7%.

Example 16

Hydrous EVOH pellets with a methanol content of 0.01%, a water content of 25%, a sodium content of 0.014 part (per 100 parts of EVOH), a calcium content of 0.004 part (per 100 parts of EVOH) and a phosphate radical content of 0.008 part (per 100 parts of EVOH) were obtained in the same manner as in Example 15 except that pellets of an EVOH (A) with an ethylene content of 35 mole percent and a degree of saponification of 99.8 mole percent were used and treated with an aqueous solution containing acetic acid, phosphoric acid and calcium dihydrogen phosphate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Example 17

Hydrous EVOH pellets with a methanol content of 0.01%, a water content of 35%, a sodium content of 0.009 part (per 100 parts of EVOH), a magnesium content of 0.0015 part (per 100 parts of EVOH) and a phosphate radical content of 0.008 part (per 100 parts of EVOH) were obtained in the same manner as in Example 15 except that pellets of an EVOH (A) with an ethylene content of 35 mole percent and a degree of saponification of 99.8 mole percent were used and treated with an aqueous solution containing acetic acid, phosphoric acid and magnesium dihydrogen phosphate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 33%, the water content of the film after first stretching was 28%, the water content of the film after second stretching was 1.5%, and the water content of the stretched film after moisture conditioning was 2.5%.

Example 18

Hydrous EVOH pellets with a methanol content of 0.01%, a water content of 35%, a sodium content of 0.025 part (per 100 parts of EVOH), a magnesium content of 0.0022 part (per 100 parts of EVOH) and a phosphate radical content of 0.01 part (per 100 parts of EVOH) were obtained in the same manner as in Example 15 except that pellets of an EVOH (A) with an ethylene content of 28 mole percent and a degree of saponification of 98.6 mole percent were used and treated with an aqueous solution containing acetic acid, phosphoric acid and magnesium dihydrogen phosphate. The hydrous EVOH pellets had a storage elastic modulus at 20° C. of $4.5 \times 10^6$ Pa.

Using these hydrous EVOH pellets, film production, stretching, thermal fixation and moisture conditioning were carried out and the films obtained were evaluated in the same manner as mentioned above. The water content at the raw film stage was 33%, the water content of the film after first stretching was 28%, the water content of the film after second stretching was 1.5%, and the water content of the stretched film after moisture conditioning was 2.8%.

Comparative Example 12

The procedure of Example 15 was followed using hydrous EVOH pellets with a methanol content of 0.0005% and a water content of 4.8%. (Since, however, the resin did not melt at 120° C., hence could not be extruded, the film extrusion molding was performed at 190° C.). The film (raw film) obtained had streaks and fish eyes and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of 4×10⁷ Pa.

Comparative Example 13

The procedure of Example 15 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 15.

The hydrous EVOH pellets had a storage elastic modulus at 20° C. of 1×10⁶ Pa.

Comparative Example 14

The procedure of Example 15 was followed using hydrous EVOH pellets with a methanol content of 0.0001% and a water content of 0.5%. (Since, however, the resin did not melt at 120° C., hence could not be extruded, the film extrusion molding was performed at 210° C.). The film (raw film) obtained had streaks and fish eyes about 0.1 mm in size and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of 2×10⁸ Pa.

Results

The results of evaluation as obtained in Examples 15 to 18 and Comparative Examples 12 to 14 are shown in Table 7 (for the raw films) and Table 8 (for the stretched films). In Tables 7 and 8, "FE" stands for fish eyes (evaluation 1) and "DC" for discoloration.

TABLE 7

(Raw films)

|  | 4-Day continuous operation Film appearance | | | 10-Day continuous operation Film appearance | | |
| --- | --- | --- | --- | --- | --- | --- |
|  | Streaks | FE | DC | Streaks | FE | DC |
| Example 15 | ○ | ○ | ○ | ○ | ○ | ○ |
| Example 16 | ○ | ○ | ○ | ○ | ○ | ○ |
| Example 17 | ○ | ○ | ○ | ○ | ○ | ○ |
| Example 18 | ○ | ○ | ○ | ○ | ○ | ○ |

TABLE 7-continued (Raw films)

|  | 4-Day continuous operation Film appearance | | | 10-Day continuous operation Film appearance | | |
| --- | --- | --- | --- | --- | --- | --- |
|  | Streaks | FE | DC | Streaks | FE | DC |
| Compar. Ex. 12 | x | ○ | ○ | x | x | Δ |
| Compar. Ex. 13 | x | ○ | ○ | x | ○ | ○ |
| Compar. Ex. 14 | x | x | ○ | x | x | Δ |

TABLE 8

(Stretched films)

|  | 4-Day continuous operation Film appearance | | | 10-Day continuous operation Film appearance | | |
| --- | --- | --- | --- | --- | --- | --- |
|  | Streaks | FE | DC | Streaks | FE | DC |
| Example 15 | ○ | ○ | ○ | ○ | ○ | ○ |
| Example 16 | ○ | ○ | ○ | ○ | ○ | ○ |
| Example 17 | ○ | ○ | ○ | ○ | ○ | ○ |
| Example 18 | ○ | ○ | ○ | ○ | ○ | ○ |
| Compar. Ex. 12 | (No stretched film was obtained.) | | | | | |
| Compar. Ex. 13 | x | ○ | ○ | x | ○ | ○ |
| Compar. Ex. 14 | (No stretched film was obtained.) | | | | | |

Examples 19 to 22 and Comparative Examples 15 to 17

Example 19

Saponification was carried out in the same manner as in Example 1 except that an ethylene-vinyl acetate copolymer with an ethylene content of 40 mole percent was used, to give an EVOH (A) with an ethylene content of 40 mole percent and a degree of saponification of 99.0 mole percent.

Further, following the procedure of Example 1, hydrous, porous EVOH pellets were produced and treated in acetic acid-water with stirring, then in water with stirring and further treated in a mixed aqueous solution containing acetic acid and dipotassium hydrogen phosphate with stirring, followed by drying to give hydrous EVOH pellets with a methanol content of 0.01%, a water content of 37.5%, a potassium content of 0.0155 part (per 100 parts of EVOH) and a phosphate radical content of 0.02 part (per 100 parts of EVOH). These hydrous EVOH pellets had a storage elastic modulus at 20° C. of 4×10⁶ Pa.

These hydrous EVOH pellets were molded under the above-mentioned film forming conditions (with extrusion temperature conditions 2) to give a film having a thickness of 120 μm. Long-run operations (4 days and 10 days) were carried out and film appearance evaluation was made in the above-mentioned manner.

Then, using this film as the raw film, sequential biaxial stretching, thermal fixation and moisture conditioning were carried out continuously under the conditions mentioned above to give a stretched film. The water content at the raw film stage was 35%, the water content of the film after first stretching was 30%, the water content of the film after second stretching was 2%, and the water content of the stretched film after moisture conditioning was 2.5%.

Example 20

Hydrous EVOH pellets with a methanol content of 0.01%, a water content of 25%, a potassium content of 0.016 part (per 100 parts of EVOH) and a phosphate radical content of 0.01 part (per 100 parts of EVOH) were obtained in the same manner as in Example 19 except that pellets of an EVOH (A) with an ethylene content of 35 mole percent and a degree of saponification of 99.8 mole percent were used and treated with a mixed aqueous solution containing dipotassium hydrogen phosphate and potassium acetate. The hydrous EVOH pellets had a storage elastic modulus at 20° C. of $4\times10^6$ Pa.

Using these hydrous EVOH pellets, film production, stretching, thermal fixation and moisture conditioning were carried out and the films obtained were evaluated in the same manner as mentioned above. The water content at the raw film stage was 25%, the water content of the film after first stretching was 22%, the water content of the film after second stretching was 0.6%, and the water content of the stretched film after moisture conditioning was 2.5%.

Example 21

Hydrous EVOH pellets with a methanol content of 0.01%, a water content of 35%, a sodium content of 0.0153 part (per 100 parts of EVOH) and a phosphate radical content of 0.02 part (per 100 parts of EVOH) were obtained in the same manner as in Example 19 except that pellets of an EVOH (A) with an ethylene content of 28 mole percent and a degree of saponification of 98.6 mole percent were used and treated with a mixed aqueous solution containing disodium hydrogen phosphate and sodium acetate. The hydrous EVOH pellets had a storage elastic modulus at 20° C. of $4\times10^6$ Pa.

Using these hydrous EVOH pellets, film production, stretching, thermal fixation and moisture conditioning were carried out and the films obtained were evaluated in the same manner as mentioned above. The water content at the raw film stage was 33%, the water content of the film after first stretching was 28%, the water content of the film after second stretching was 1.5%, and the water content of the stretched film after moisture conditioning was 2.8%.

Example 22

Hydrous EVOH pellets with a methanol content of 0.01%, a water content of 25%, a potassium content of 0.022 part (per 100 parts of EVOH) and a phosphate radical content of 0.018 part (per 100 parts of EVOH) were obtained in the same manner as in Example 19 except that pellets of an EVOH (A) with an ethylene content of 35 mole percent and a degree of saponification of 99.8 mole percent were used and treated with an aqueous solution of tripotassium phosphate. The hydrous EVOH pellets had a storage elastic modulus at 20° C. of $4\times10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Comparative Example 15

The procedure of Example 19 was followed using hydrous EVOH pellets with a methanol content of 0.0005% and a water content of 4.8%. (Since, however, the resin did not melt at 120° C., hence could not be extruded, the film extrusion molding was performed at 190° C.). The film (raw film) obtained had streaks and fish eyes and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $3.5\times10^7$ Pa.

Comparative Example 16

The procedure of Example 19 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 19.

The hydrous EVOH pellets had a storage elastic modulus at 20° C. of $1\times10^6$ Pa.

Comparative Example 17

The procedure of Example 19 was followed using hydrous EVOH pellets with a methanol content of 0.0001% and a water content of 0.5%. (Since, however, the resin did not melt at 120° C., hence could not be extruded, the film extrusion molding was performed at 210° C.). The film (raw film) obtained had streaks and fish eyes about 0.1 mm in size and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $1\times10^8$ Pa.

Results

The results of evaluation as obtained in Examples 19 to 22 and Comparative Examples 15 to 17 are shown in Table 9 (for the raw films) and Table 10 (for the stretched films). In Tables 9 and 10, "FE" stands for fish eyes (evaluation 1) and "DC" for discoloration.

TABLE 9

| | (Raw films) | | | | | |
| --- | --- | --- | --- | --- | --- | --- |
| | 4-Day continuous operation Film appearance | | | 10-Day continuous operation Film appearance | | |
| | Streaks | FE | DC | Streaks | FE | DC |
| Example 19 | ○ | ○ | ○ | ○ | ○ | ○ |
| Example 20 | ○ | ○ | ○ | ○ | ○ | ○ |
| Example 21 | ○ | ○ | ○ | ○ | ○ | ○ |
| Example 22 | ○ | ○ | ○ | ○ | ○ | ○ |
| Compar. Ex. 15 | x | ○ | ○ | x | x | Δ |
| Compar. Ex. 16 | x | ○ | ○ | x | ○ | ○ |
| Compar. Ex. 17 | x | x | ○ | x | x | Δ |

TABLE 10

| | (Stretched films) | | | | | |
| --- | --- | --- | --- | --- | --- | --- |
| | 4-Day continuous operation Film appearance | | | 10-Day continuous operation Film appearance | | |
| | Streaks | FE | DC | Streaks | FE | DC |
| Example 19 | ○ | ○ | ○ | ○ | ○ | ○ |
| Example 20 | ○ | ○ | ○ | ○ | ○ | ○ |
| Example 21 | ○ | ○ | ○ | ○ | ○ | ○ |
| Example 22 | ○ | ○ | ○ | ○ | ○ | ○ |
| Compar. Ex. 15 | (No stretched film was obtained.) | | | | | |
| Compar. Ex. 16 | x | ○ | ○ | x | ○ | ○ |
| Compar. Ex. 17 | (No stretched film was obtained.) | | | | | |

Examples 23 to 26 and Comparative Examples 18 to 20

Example 23

Saponification was carried out in the same manner as in Example 1 to give an EVOH (A) with an ethylene content of 40 mole percent and a degree of saponification of 99.0 mole percent.

Further, following the procedure of Example 1, hydrous, porous EVOH pellets were produced and treated in acetic acid-water with stirring and further treated in a mixed aqueous solution containing acetic acid, potassium acetate, magnesium acetate and potassium dihydrogen phosphate with stirring, followed by drying to give hydrous EVOH pellets with a methanol content of 0.01%, a water content of 37.5%, a potassium content of 0.006 part (per 100 parts of EVOH), a magnesium content of 0.0018 part (per 100 parts of EVOH) and a phosphate radical content of 0.005 part (per 100 parts of EVOH). These hydrous EVOH pellets had a storage elastic modulus at 20° C. of $4 \times 10^6$ Pa.

These hydrous EVOH pellets were molded under the above-mentioned film forming conditions (with extrusion temperature conditions 2) to give a film having a thickness of 120 μm. Long-run operations (4 days and 10 days) were carried out and film appearance evaluation was made in the above-mentioned manner.

Then, using this film as the raw film, sequential biaxial stretching, thermal fixation and moisture conditioning were carried out continuously under the conditions mentioned above to give a stretched film. The water content at the raw film stage was 35%, the water content of the film after first stretching was 30%, the water content of the film after second stretching was 2%, and the water content of the stretched film after moisture conditioning was 2.5%.

Example 24

Hydrous EVOH pellets with a methanol content of 0.01%, a water content of 25%, a potassium content of 0.012 part (per 100 parts of EVOH) and a phosphate radical content of 0.004 part (per 100 parts of EVOH) were obtained in the same manner as in Example 23 except that pellets of an EVOH (A) with an ethylene content of 35 mole percent and a degree of saponification of 99.8 mole percent were used and treated with a mixed aqueous solution containing acetic acid, potassium acetate and disodium hydrogen phosphate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Example 25

Hydrous EVOH pellets with a methanol content of 0.01%, a water content of 35%, a sodium content of 0.005 part (per 100 parts of EVOH), a calcium content of 0.01 part (per 100 parts of EVOH) and a phosphate radical content of 0.0087 part (per 100 parts of EVOH) were obtained in the same manner as in Example 23 except that pellets of an EVOH (A) with an ethylene content of 28 mole percent and a degree of saponification of 98.6 mole percent were used and treated with a mixed aqueous solution containing acetic acid, sodium acetate, calcium acetate and phosphoric acid. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 33%, the water content of the film after first stretching was 28%, the water content of the film after second stretching was 1.5%, and the water content of the stretched film after moisture conditioning was 2.8%.

Example 26

Hydrous EVOH pellets with a methanol content of 0.01%, a water content of 25%, a potassium content of 0.002 part (per 100 parts of EVOH), a calcium content of 0.006 part (per 100 parts of EVOH) and a phosphate radical content of 0.002 part (per 100 parts of EVOH) were obtained in the same manner as in Example 23 except that pellets of an EVOH (A) with an ethylene content of 35 mole percent and a degree of saponification of 99.8 mole percent were used and treated with a mixed aqueous solution containing acetic acid, potassium acetate, calcium acetate and sodium dihydrogen phosphate. The hydrous EVOH pellets had a storage elastic modulus at 20° C. of $4 \times 10^6$ Pa.

Using these hydrous EVOH pellets, film production, stretching, thermal fixation and moisture conditioning were carried out and the films obtained were evaluated in the same manner as mentioned above. The water content at the raw film stage was 22%, the water content of the film after first stretching was 20%, the water content of the film after second stretching was 0.6%, and the water content of the stretched film after moisture conditioning was 2.5%.

Comparative Example 18

The procedure of Example 23 was followed using hydrous EVOH pellets with a methanol content of 0.0005% and a water content of 4.8%. (Since, however, the resin did not melt at 120° C., hence could not be extruded, the film extrusion molding was performed at 190° C.). The film (raw film) obtained had streaks and fish eyes and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $4 \times 10^7$ Pa.

Comparative Example 19

The procedure of Example 23 was followed using hydrous EVOH pellets with a methanol content of 1% and a water content of 67%. In the step of film (raw film) molding, water deposited in the feed section of the barrel, whereby the output became unstable. Although the raw film obtained for stretching was ununiform in film thickness, this film was subjected to continuous stretching treatment in the same manner as in Example 23.

The hydrous EVOH pellets had a storage elastic modulus at 20° C. of $1 \times 10^6$ Pa.

Comparative Example 20

The procedure of Example 23 was followed using hydrous EVOH pellets with a methanol content of 0.0001% and a water content of 0.5%. (Since, however, the resin did not melt at 120° C., hence could not be extruded, the film extrusion molding was performed at 210° C.). The film (raw film) obtained had streaks and fish eyes about 0.1 mm in size and, further, discoloration was also observed. In the stretching treatment, film breakage occurred in the process of second stretching, hence stable drawing was impossible and any satisfactory stretched film could not be obtained.

The hydrous EVOH pellets had a storage elastic modulus at 20° C. of $1 \times 10^8$ Pa.

Results

The results of evaluation as obtained in Examples 23 to 26 and Comparative Examples 18 to 20 are shown in Table 11 (for the raw films) and Table 12 (for the stretched films). In Tables 11 and 12, "FE" stands for fish eyes (evaluation 1) and "DC" for discoloration.

TABLE 11

(Raw films)

| | 4-Day continuous operation Film appearance | | | 10-Day continuous operation Film appearance | | |
|---|---|---|---|---|---|---|
| | Streaks | FE | DC | Streaks | FE | DC |
| Example 23 | ○ | ○ | ○ | ○ | ○ | ○ |
| Example 24 | ○ | ○ | ○ | ○ | ○ | ○ |
| Example 25 | ○ | ○ | ○ | ○ | ○ | ○ |
| Example 26 | ○ | ○ | ○ | ○ | ○ | ○ |
| Compar. Ex. 18 | x | ○ | ○ | x | x | Δ |
| Compar. Ex. 19 | x | ○ | ○ | x | ○ | ○ |
| Compar. Ex. 20 | x | x | ○ | x | x | Δ |

TABLE 12

(Stretched films)

| | 4-Day continuous operation Film appearance | | | 10-Day continuous operation Film appearance | | |
|---|---|---|---|---|---|---|
| | Streaks | FE | DC | Streaks | FE | DC |
| Example 23 | ○ | ○ | ○ | ○ | ○ | ○ |
| Example 24 | ○ | ○ | ○ | ○ | ○ | ○ |
| Example 25 | ○ | ○ | ○ | ○ | ○ | ○ |
| Example 26 | ○ | ○ | ○ | ○ | ○ | ○ |
| Compar. Ex. 18 | (No stretched film was obtained.) | | | | | |
| Compar. Ex. 19 | x | ○ | ○ | x | ○ | ○ |
| Compar. Ex. 20 | (No stretched film was obtained.) | | | | | |

Example 27

Hydrous, porous EVOH pellets with an ethylene content of 35 mole percent and a degree of saponification of 99.8 mole percent were produced, then washed with water and dried to give hydrous EVOH pellets with a water content of 35% and a methanol content of 0.01%, which had a storage elastic modulus at 20° C. of $4 \times 10^6$ Pa.

These hydrous EVOH pellets were fed to a single-screw extruder fitted with a T die and extrusion-molded under the following conditions to give a film having a thickness of about 280 μm.

| Screw inside diameter: | 65 mm |
|---|---|
| L/D: | 28 |
| Screw compression ratio: | 3.8 |
| T die: | Coat hanger type |
| Die width: | 450 mm |
| Extrusion temperatures: | |
| | $C_1$: 110° C., H: 95° C. |
| | $C_2$: 120° C., D: 95° C. |
| | $C_3$: 110° C. |
| | $C_4$: 95° C. |
| | $C_5$: 95° C. |

Using this film (water content of 28%) as the raw film, sequential biaxial stretching and thermal fixation were carried out continuously under the conditions shown below to give a stretched film.

First stretching (MD stretching) conditions

| Stretching machine | Roll type primary stretcher |
|---|---|
| Stretching roll temperature | 65° C. |
| MD stretching ratio | 4.0 times |
| Post-stretching film thickness | 75 μm |

Second stretching (TD stretching) conditions

| Stretching machine | Tenter type biaxial stretcher |
|---|---|
| Stretching roll temperature | 95° C. |
| TD stretching ratio | 4.5 times |
| Post-stretching film thickness | 15 μm |

Thermal fixation conditions

| Temperature | 160° C. |
|---|---|
| Time | 5 seconds |

Figure 2:
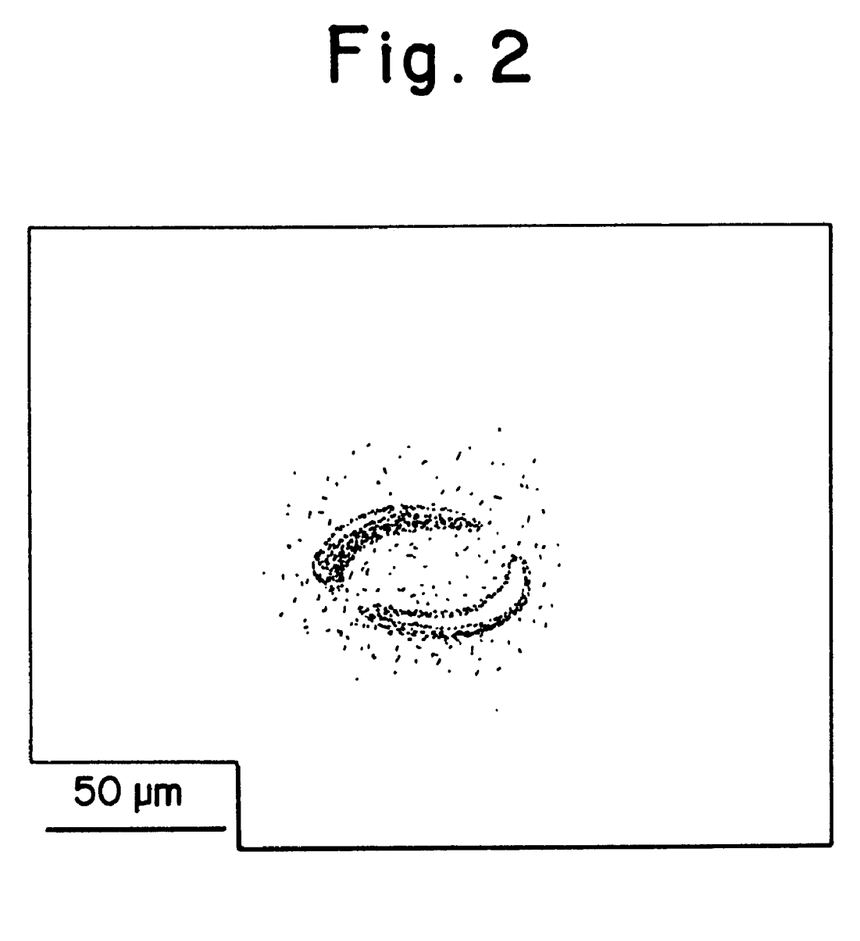
FIG. 2 is a photomicrograph showing the surface state of the stretched film of Example 27 as taken by means of a differential interference microscope.

The surface of the thus-obtained stretched film was examined under a differential interference microscope (Nikon's "OPTIPHOT-2"). Caldera-like elliptically raised portions were found, as shown in FIG. 2, and the number thereof was 14 per square millimeter. These 14 protuberances had a major axis of 35 to 95 μm. These 14 protuberances were measured for their height using a universal surface shape measuring apparatus (MODEL SE-30K, product of Kabushiki Kaisha Kosaka Kenkyusho) and said height, namely the height from the lowest point within the caldera to the highest point of the rim, was found to be 0.1 to 0.9 mm for the 14 protuberances.

This stretched film was evaluated for transparency and slip characteristics and a laminate thereof was evaluated for interlaminar adhesion in the following manner.

<Evaluation of the biaxially oriented film>

Transparency

The haze value was measured using a haze meter NDH-300A (product of Nippon Denshoku Kogyo Kabushiki Kaisha). The evaluation criteria were as follows:

○ . . . less than 0.5%

Δ . . . not less than 0.5% but less than 1.0% x . . . not less than 1.0%

Slip characteristics

The coefficient of dynamic friction between film surfaces was measured using a model TR friction tester (product of Toyo Seiki Seisakusho; load: 200 g). The evaluation criteria were as follows:

ο . . . less than 0.6

Δ . . . not less than 0.6 x . . . not measurable

Interlaminar adhesion

The stretched film obtained was overlaid with a commercial unstretched polypropylene film (25 μm thick) using a dry laminating adhesive (Adcote AD 335A/CAT-10; product of Toyo Morton Kabushiki Kaisha) and the laminate was cured at 40° C. for one day and then cut to strips with a width of 15 mm and the strips were measured for bonding strength (20° C.; rate of pulling: 300 mm/min) by the T-peel method using Autograph S-100 (product of Shimadzu Corp.). The evaluation criteria were as follows:

⊙ . . . not less than 500 g/15 mm

ο . . . not less than 300 g/15 mm but less than 500 g/15 mm

Δ . . . not less than 100 g/15 mm but less than 300 g/15 mm x . . . less than 100 g/15 mm

Example 28

A stretched EVOH film was obtained in the same manner as in Example 27 except that the primary stretching temperature was 70° C., the secondary stretching temperature was 110° C., the thermal fixation temperature was 170° C. and the thermal fixation time was 4 seconds. Said film had 19 caldera-like elliptically raised portions per square millimeter which had a major axis of 25 to 100 μm and a protuberance height of 0.1 to 0.8 μm.

Example 29

A stretched EVOH film was obtained in the same manner as in Example 27 except that the longitudinal stretching ratio was 4.5 times, the transverse stretching ratio was 5.0 times and the thickness after stretching was 12 μm. Said film had 15 caldera-like elliptically raised portions per square millimeter which had a major axis of 35 to 95 μm and a protuberance height of 0.1 to 1.1 μm.

Example 30

A stretched EVOH film was obtained in the same manner as in Example 27 except that an EVOH with an ethylene content of 44 mole percent and a degree of saponification of 99.8 mole percent was used and that the primary stretching temperature was 70° C., the secondary stretching temperature was 100° C., the thermal fixation temperature was 155° C. and the thermal fixation time was 7 seconds. Said film had 13 caldera-like elliptically raised portions per square millimeter which had a major axis of 30 to 70 μm and a protuberance height of 0.1 to 0.8 μm.

<Evaluation results>

The evaluation results obtained in Examples 27 to 30 are shown in Table 13.

TABLE 13

|  | Transparency | Slip | Interlammar adhesion |
|---|---|---|---|
| Example 27 | ο | ο | ⊙ |
| Example 28 | ο | ο | ⊙ |
| Example 29 | ο | ο | ⊙ |
| Example 30 | ο | ο | ⊙ |

What is claimed is:

1. A process for producing a molded product comprising:

melt molding a hydrous pellets of an ethylene-vinyl acetate copolymer hydrolyzate (A) having an ethylene content of 5 to 60 mole percent and a degree of saponification of not less than 90 mole percent at a melt temperature of 60 to 140° C. to form a film, wherein said hydrous pellets are produced in the wet throughout the production process, by extruding a solution of said ethylene-vinyl acetate copolymer hydrolyzate (A) in a mixed solvent composed of water and an alcohol in the form of a strand through a nozzle into a coagulating bath comprising water or a mixed solvent composed of water and an alcohol, cutting the strand after coagulation to porous pellets containing water and the alcohol in large amounts, washing the porous pellets by contacting them with water, and drying them to give hydrous pellets which have a water content of 5 to 60% by weight, contain 0.00001 to 0.1% by weight of an alcohol (B) containing 1 to 5 carbon atoms and have a storage elastic modulus at 20° C. of $2 \times 10^6$ to $5 \times 10^7$ Pa.

2. A process for producing a molded product as claimed in claim 1, wherein said hydrous pellets contain at least one compound (C) selected from the group consisting of a boron compound (c1), acetic acid (c2), an alkaline metal acetate (c3), an alkaline earth metal acetate (c4) and a phosphoric acid compound (c5) in an effective amount, within the range of 0 to 1 part by weight per 100 parts by weight of the ethylene-vinyl acetate copolymer hydrolyzate (A).

3. A process for producing a molded product as claimed in claim 1, wherein said hydrous pellets contains at least one compound (C) selected from the group consisting of a boron compound (c1), acetic acid (c2), an alkaline metal acetate (c3), an alkaline earth metal acetate (c4) and a phosphoric acid compound (c5) in an amount, per 100 parts by weight of the ethylene vinyl acetate copolymer hydrolyzate (A), of 0.001 to 1 part by weight on the boron basis when said compound (C) is a boron compound (c1), 0.001 to 1 part by weight when said compound (C) is acetic acid (c2), 0.0001 to 0.1 part by weight of the alkali metal basis when said compound (C) is an alkali metal acetate (c3), 0.0001 to 0.1 part by weight on the alkaline earth metal basis when said compound (C) is an alkaline earth metal acetate (c4), or 0.0005 to 0.1 part by weight on the phosphate radical basis when said compound (C) is a phosphoric acid compound (c5), and when two or more compounds (C) belonging to different categories are used, the compound (C) of one category meets the above quantity requirement for said category and the amounts of the other compounds (C) do not exceed the upper limits imposed above on the respective categories.

4. A process for producing molded product as claimed in claim 1 as further subjected to drawing after melt molding.

5. A process for producing molded product as claimed in claim 4 which, after drawing, has caldera-like elliptically raised portions having a major axis of 10 to 150 μm and a circumferential rim height of 0.1 to 3 μm on the surface thereof at a frequency of occurrence of not less than one per square millimeter.

* * * * *